United States Patent
Durrett et al.

(10) Patent No.: US 8,646,421 B2
(45) Date of Patent: Feb. 11, 2014

(54) ENGINE WITH INTERNAL EXHAUST GAS RECIRCULATION AND METHOD THEREOF

(75) Inventors: Russell P. Durrett, Bloomfield Hills, MI (US); Venkatesh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1146 days.

(21) Appl. No.: 12/604,822

(22) Filed: Oct. 23, 2009

(65) Prior Publication Data

US 2011/0094462 A1   Apr. 28, 2011

(51) Int. Cl.
    *F02B 33/22* (2006.01)
(52) U.S. Cl.
    USPC ............ 123/70 R; 123/58.8; 123/568.14
(58) Field of Classification Search
    USPC ........... 123/70 R, 65 R, 69 R, 69 V, 72, 311, 123/568.13, 568.14, 568.11, 58.8; 60/307, 60/308
    See application file for complete search history.

(56) References Cited

U.S. PATENT DOCUMENTS

| | | | |
|---|---|---|---|
| 1,176,252 A | 3/1916 | Schenker | |
| 1,634,468 A | 7/1927 | Muller | |
| 1,639,165 A * | 8/1927 | Burtnett | 123/51 A |
| 1,771,335 A | 9/1927 | Karpes | |
| 1,690,080 A | 10/1928 | Seng et al. | |
| 1,904,070 A * | 4/1933 | Morgan | 60/620 |
| 3,896,775 A | 7/1975 | Melby | |
| 4,159,699 A * | 7/1979 | McCrum | 123/58.8 |
| 4,159,700 A * | 7/1979 | McCrum | 123/58.8 |
| 4,202,300 A | 5/1980 | Skay | |
| 4,237,832 A * | 12/1980 | Hartig et al. | 123/58.8 |
| 4,565,167 A | 1/1986 | Bryant | |
| 4,917,054 A | 4/1990 | Schmitz | |
| 5,072,589 A * | 12/1991 | Schmitz | 60/622 |
| 5,542,382 A | 8/1996 | Clarke | |
| 6,386,154 B1 * | 5/2002 | Hellman et al. | 123/58.8 |
| 6,553,977 B2 * | 4/2003 | Schmitz | 123/561 |
| 6,698,405 B2 | 3/2004 | Bigi | |
| 7,219,634 B2 | 5/2007 | Hitomi et al. | |
| 8,371,256 B2 * | 2/2013 | Durrett et al. | 123/70 R |
| 2004/0060527 A1 * | 4/2004 | Hitomi et al. | 123/58.8 |
| 2004/0123820 A1 * | 7/2004 | Hasegawa et al. | 123/58.8 |
| 2004/0168655 A1 * | 9/2004 | Hitomi et al. | 123/58.8 |
| 2009/0223482 A1 * | 9/2009 | Schmitz | 123/311 |

FOREIGN PATENT DOCUMENTS

| | | |
|---|---|---|
| CN | 101135266 A | 3/2008 |
| DE | 4441590 C1 | 2/1996 |
| DE | 19630520 A1 | 4/1997 |
| EP | 959233 A1 | 11/1999 |
| WO | 03058043 A1 | 7/2003 |

* cited by examiner

*Primary Examiner* — Hung Q Nguyen
(74) *Attorney, Agent, or Firm* — Quinn Law Group, PLLC (57) ABSTRACT

An internal combustion engine has four cylinders, each having a respective piston positioned therein and connected with a crankshaft for movement in the respective cylinder. Each cylinder has a plurality of ports with a plurality of valves openable and closable to control fluid flow into and out of the cylinder through the ports. Combustion occurs in a first two of the four cylinders (power cylinders) that are each interconnected between a second two of the four cylinders (inductor cylinders) via passages connecting ports of the respective cylinders. Opening and closing of the valves is timed to accomplish internal exhaust gas recirculation, i.e., such that fluid directed from the power cylinders to the inductor cylinders via the passages after combustion is redirected via the passages from the inductor cylinders to the power cylinders. A method of internal exhaust gas recirculation for an engine as described above is also provided.

14 Claims, 6 Drawing Sheets

| CYLINDER | | | | |
|---|---|---|---|---|
| STROKE | 18A | 18B | 18C | 18D |
| 1 | INT | E2 | C2 | E2 |
| 2 | C1 | C1 | E1 | EX |
| 3 | E2 | C2 | E2 | INT |
| 4 | EX | E1 | C1 | C1 |
| 5 | INT | E2 | C2 | E2 |
| 6 | C1 | C1 | E1 | EX |
| 7 | E2 | C2 | E2 | INT |
| 8 | EX | E1 | C1 | C1 |
| 9 | INT | E2 | C2 | E2 |
| 10 | C1 | C1 | E1 | EX |
| 11 | E2 | C2 | E2 | INT |
| 12 | EX | E1 | C1 | C1 |

FIG. 2B

Stroke 1
FIG. 3

Stroke 2
FIG. 4

Stroke 3
FIG. 5

Stroke 4
FIG. 6

Stroke 5
FIG. 7

Stroke 6
FIG. 8

Stroke 7
FIG. 9

Stroke 8
FIG. 10

Stroke 9
FIG. 11

Stroke 10
FIG. 12

Stroke 11
FIG. 13

Stroke 12
FIG. 14

ENGINE WITH INTERNAL EXHAUST GAS RECIRCULATION AND METHOD THEREOF

TECHNICAL FIELD

The invention relates to an internal combustion engine with dual compression and dual expansion, and configured for internal exhaust gas recirculation and a method of recirculating exhaust gas.

BACKGROUND OF THE INVENTION

In order to enhance the volumetric efficiency of modern internal combustion engines, whether of the spark ignition type or the compression ignition (diesel) type, forced induction devices, such as turbochargers and superchargers are added to the engine. Furthermore, most modern internal combustion engines utilize an exhaust gas recirculation (EGR) system in which a portion of an engine's exhaust gas is recirculated back to the engine cylinders. EGR is used mainly to reduce nitrogen oxide (NOx) emissions. By mixing the incoming air with recirculated exhaust gas, the fluid mixture is diluted with inert gas (the recirculated gas), lowering the flame temperature and reducing the amount of excess oxygen in diesel engines. The exhaust gas also increases the specific heat capacity of the mix, lowering the peak combustion temperature, thereby limiting the formation of NOx.

An external EGR system routes exhaust gas from the exhaust manifold to the inlet manifold. A control valve (EGR Valve) within the system regulates and times the exhaust gas flow. Some engine designs trap exhaust gas within the cylinder by not fully expelling it during the exhaust stroke. This is referred to as an internal EGR system.

SUMMARY OF THE INVENTION

An internal EGR system is provided on an internal combustion engine having fluidly interconnected cylinders. Specifically, an internal combustion engine is provided that has four cylinders, each having a respective piston positioned therein and connected with a crankshaft for movement in the respective cylinder. Each cylinder has a plurality of ports with a plurality of valves openable and closable to control fluid flow into and out of the cylinder through the ports. Combustion occurs in a first two of the four cylinders (referred to as power cylinders) that are each operatively interconnected in fluid flow communication between a second two of the four cylinders (referred to as inductor cylinders) via passages connecting ports of the respective cylinders. Fluid flow through the passages is controlled by the valves. Opening and closing of the valves is timed to accomplish internal exhaust gas recirculation, i.e., such that fluid directed from the power cylinders to the inductor cylinders via the passages after combustion is redirected via the passages from the inductor cylinders to the power cylinders. The internal exhaust gas recirculation may be by recompression in the inductor cylinders, exhaust valve re-breathing, or intake valve re-breathing.

A method of internal exhaust gas recirculation for an engine as described above is also provided. The method includes directing fluid from a first of the two power cylinders to a first of the two inductor cylinders. Combustion occurs in the two power cylinders, and air intake and exhaust occurs in the two inductor cylinders. The two power cylinders are each separately selectively connected to the two inductor cylinders via respective passages and valves. The method further includes timing the opening and closing of intake and exhaust valves of the first inductor cylinder such that at least some fluid transferred from the first power cylinder remains in the first inductor cylinder after an exhaust stroke and subsequent intake stroke in the first inductor cylinder, i.e., internal exhaust gas recirculation is accomplished. The method further includes directing the fluid in the first inductor cylinder to the second power cylinder so that the fluid is again subjected to combustion in the second power cylinder.

With the engine described above, an external EGR loop may not be required. Thus, cost savings may be realized as external passages, an EGR valve and an EGR cooler are not required. Associated external EGR fouling issues would thus be avoided. Additionally, volumetric efficiency would be improved with the two stage expansion and compression, such that a turbocharger may not be required. Emissions would be improved by enabling a higher EGR percentage while maintaining a high air-to-fuel ratio.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
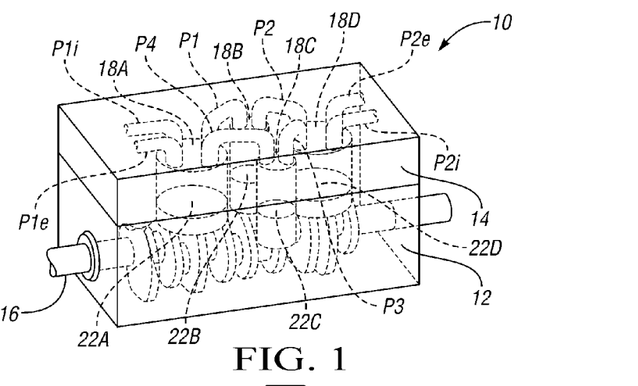
FIG. 1 is a schematic perspective illustration of one embodiment of an engine utilizing four cylinders, each with a four-stroke cycle, interconnected with one another, and having valves timed to provide dual compression, dual expansion, and internal exhaust gas recirculation.

Referring to the drawings, wherein like reference numbers represent like components throughout the several views, FIG. 1 shows an engine 10 having an engine block 12, a cylinder head 14, and a crankshaft 16 supported for rotation within the engine block 12. The engine 10 has four cylinders 18A, 18B, 18C, 18D bored or otherwise provided within the engine block 12. Each cylinder 18A, 18B, 18C, 18D has a respective piston 22A, 22B, 22C, 22D operatively connected to the crankshaft 16 such that rotation of the crankshaft 16 causes the pistons 22A, 22B, 22C, 22D to ride up and down within the cylinders 18A, 18B, 18C, 18D. An engineer of ordinary skill in the art will readily understand the many known ways in which the pistons 22A, 22B, 22C, 22D can be operatively connected with the crankshaft 16, such as by connecting rods.

The cylinders 18A, 18B, 18C, 18D are interconnected with one another by first, second, third, and fourth passages P1, P2, P3, P4, respectively, machined or formed in the engine block 12 and/or the cylinder head 14, with various valves controlling flow between the cylinders 18A, 18B, 18C, 18D through the passages P1, P2, P3, P4, as further described below. Additional passages P1$i$ and P1$e$ serve as air inlet and exhaust passages, respectively, for cylinder 18A. Similarly, passages P2$i$ and P2$e$ serve as air inlet and exhaust passages, respectively, for cylinder 18D.

Figure 2A:
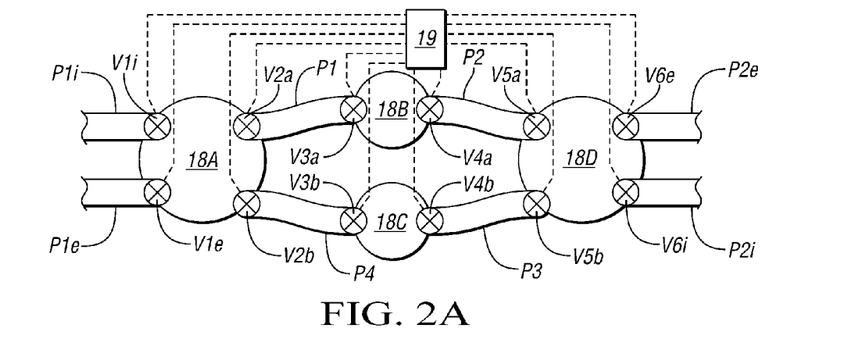
FIG. 2A is a schematic top view illustration of the engine of FIG. 1, showing the valves and fluid flow passages in relation to the cylinders.

Referring to FIG. 2A, a schematic illustration of the direction of fluid flow through the cylinders is depicted. Cylinder 18A, referred to herein as an inductor cylinder, has four ports containing four valves V1$i$, V1$e$, V2$a$ and V2$b$. Valve V1$i$ is an intake valve, and is selectively openable to permit air intake into cylinder 18A from an intake passage P1$i$ operatively connected with an intake manifold. Valve V1$e$ is an exhaust valve, and is selectively openable to permit exhaust from cylinder 18A to an exhaust passage P1$e$, operatively connected with an exhaust system of a vehicle on which the engine 10 is mounted. Valve V2$a$ is a first transfer valve, and is referred to as such as it is selectively openable to permit transfer of fluid from cylinder 18A to cylinder 18B through first passage P1. Valve V2$b$ is a second transfer valve and is referred to as such as it is selectively openable to permit transfer of fluid from cylinder 18C to cylinder 18A via fourth passage P4.

Power cylinder 18B has two ports containing two respective valves V3$a$, V4$a$, referred to as a first valve and a second valve, respectively, of cylinder 18B. Valve V3$a$ is selectively openable to permit fluid flow from cylinder 18A to cylinder 18B through passage P1. Valve V4$a$ is selectively openable to permit fluid flow from cylinder 18B to cylinder 18D through passage P2.

Power cylinder 18C has two ports containing two respective valves V4$b$, V3$b$, referred to as a first valve and a second valve, respectively, of cylinder 18C. Valve V4$b$ is selectively openable to permit fluid flow from cylinder 18D to cylinder 18C through passage P3. Valve V3$b$ is selectively openable to permit fluid flow from cylinder 18C to cylinder 18A through passage P4.

Cylinder 18D has four ports containing four valves V5$a$, V5$b$, V6$i$ and V6$e$. Valve V6$i$ is an intake valve, and is selectively openable to permit air intake into cylinder 18D from an intake passage P2$i$ operatively connected with an intake manifold. Valve V6$e$ is an exhaust valve, and is selectively openable to permit exhaust from cylinder 18D to an exhaust passage P2$e$, operatively connected with an exhaust system of a vehicle on which the engine 10 is mounted. Valve V5$b$ is a first transfer valve, and is referred to as such as it is selectively openable to permit transfer of fluid from cylinder 18D to cylinder 18C through third transfer passage P3. Valve V5$a$ is a second transfer valve and is referred to as such as it is selectively openable to permit transfer of fluid from cylinder 18B to cylinder 18D via second transfer passage P2.

The timing of opening and closing of the valves, as well as the valve lift and fuel introduction, is controlled by an engine controller 19 electronically, hydraulically, by one or more camshafts, or by a combination thereof, in conjunction with the speed and rotational position of the crankshaft 16 to affect two stage compression, combustion, two stage expansion, and internal exhaust recirculation as described below. Those skilled in the art will readily understand the control of engine valves.

Figure 2B:
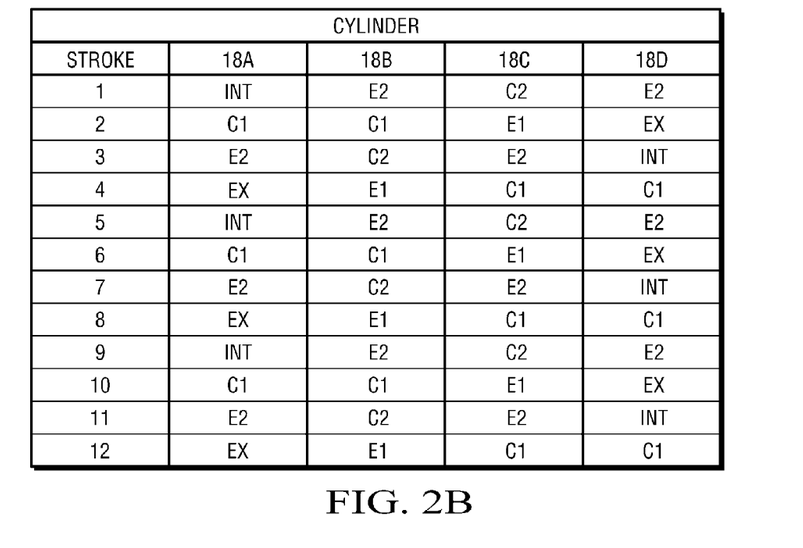
FIG. 2B is a chart showing the state of each cylinder of the engine of FIG. 1 corresponding with twelve consecutive strokes of the pistons within the cylinders.

Referring to FIG. 2B, stages of the operating cycle occurring in each cylinder 18A, 18B, 18C, 18D given the valve states (open or closed) for the various valves described with respect to FIG. 2A is shown for six crank rotations of the crankshaft 16, with two strokes occurring per crankshaft rotation. The engine 10 operates on a 4-stroke/two revolution/720 crank angle degree cycle. Twelve subsequent strokes are described herein, but strokes 1, 5 and 9 are the same, strokes 2, 6 and 10 are the same, strokes 3, 7 and 11 are the same, and strokes 4, 8 and 12 are the same. Twelve strokes are described as it takes a given sample of air mixture three complete cycles to move completely through the engine 10. As set forth in FIG. 2B, INT refers to an intake state of the cylinder during which fresh air is taken in, C1 refers to a first stage of compression, C2 refers to a second stage of compression, E1 refers to a first stage of expansion in which combustion occurs, also referred to as a combustion stage, E2 refers to a second stage of expansion, and EX refers to an exhaust state. As is apparent in FIG. 2B and the description below, combustion occurs in cylinders 18B and 18C; accordingly, cylinders 18B and 18C may be referred to as power cylinders. Air intake and exhaust occurs only in cylinders 18A and 18D; accordingly, cylinders 18A and 18D may be referred to as inductor cylinders. During some strokes, cylinder 18A acts as an intake cylinder and cylinder 18D acts as an exhaust cylinder. During other strokes, cylinder 18A acts as an exhaust cylinder and cylinder 18D acts as an intake cylinder. Combustible fuel is provided to the combustion chamber of the cylinder acting as the power cylinder, to a location adjacent the inlet valve of the power cylinder, to the inductor cylinder acting as the second stage expander cylinder, to a location adjacent the inlet valve of the expander cylinder, to the inductor cylinder acting as the first stage compressor cylinder, or to a location adjacent the inlet valve of the first stage compressor cylinder.

The cylinders 18A, 18B, 18C, 18D are interconnected and sized relative to one another such that compression and expansion occurs over two stages, in two different cylinders. In some embodiments, although not limited to such, the volume of cylinders 18A and 18D relative to cylinders 18C and 18D is such that the ratio of displacement of cylinders 18A and 18D to cylinders 18C and 18D is not greater than 5:1 and not less than 1.1:1. Thus, compression can occur over two stages, beginning with a first stage in either cylinder 18A or 18D after air intake, and continuing with a second stage in the smaller cylinder 18B and 18C, respectively, during the subsequent stroke. Similarly, expansion can occur over two stages, beginning in either cylinder 18B or 18C, and continuing with a second stage in the larger cylinder 18D and 18A, respectively.

Figures 3, 4:
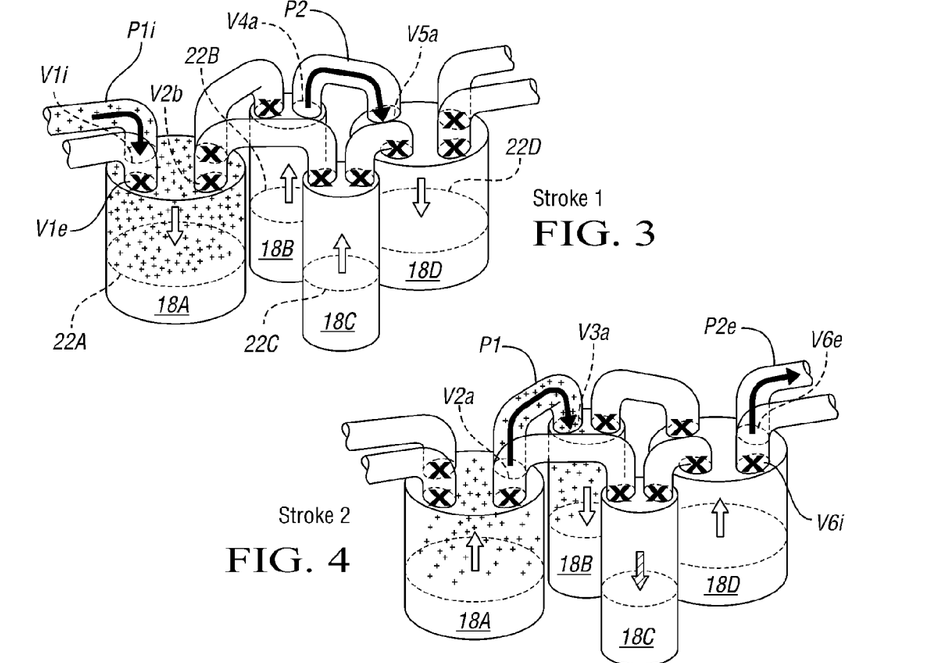
FIG. 3 is a schematic perspective illustration of the cylinders, pistons, valves, and fluid flow passages of the engine of FIG. 1, illustrating the direction of piston movement in each cylinder, fluid transfer between the cylinders, and the state of each valve during the first stroke of the chart of FIG. 2B.
FIG. 4 is a schematic perspective illustration of the cylinders, pistons, valves, and fluid flow passages of the engine of FIG. 1, illustrating the direction of piston movement in each cylinder, fluid transfer between the cylinders, and the state of each valve during the second stroke of the chart of FIG. 2B.

Referring now to FIG. 3, a portion of engine 10 is represented by cylinders 18A-18D, with pistons 22A-22D therein. The direction of piston motion (up or down) in the respective cylinder 18A-18D is indicated by an arrow immediately adjacent the respective piston. Arrows are also shown to represent the movement of fluid into and out of the cylinders and between cylinders. An open port represents an open state of the respective valve, allowing fluid flow through the port, while an "X" represents a closed state of the respective valve, preventing fluid flow through the port. During stroke 1, valves V1i, V4a and V5a are open and all other valves are closed (except that valve V1e may be open during a portion of the stroke, depending on the exhaust gas recirculation method implemented, as further described below). Thus, cylinder 18A is inducting fresh air through passage P1i while cylinder 18B undergoes second stage expansion through passage P2 via cylinder 18D, and cylinder 18C undergoes second stage compression. Although an air mixture is present in all four cylinders 18A, 18B, 18C and 18D, in FIGS. 3 to 14, only a selected portion of the air mixture is depicted in FIGS. 3-14, with circular shading (shown in FIG. 3 in the passage P1i and cylinder 18A), of a density generally representing whether expansion or compression is occurring, as the air mixture is followed as it travels from inlet through passage P1i, through the cylinders 18A, 18B and 18D, and is exhausted at cylinder 18D with at least a portion recirculated from cylinder 18D through cylinders 18C and 18D.

During a subsequent stroke 2, illustrated with respect to FIG. 4, valves V2a, V3a and V6e are open and all other valves are closed (except that valve V6i may be open during a portion of the stroke, depending on the exhaust gas recirculation method implemented, as further described below). Thus, cylinder 18A is compressing charge into cylinder 18B through passage P1, while cylinder 18D is exhausting through passage P2e. Cylinder 18C is undergoing a power stroke and first stage of expansion. A portion of the exhaust gas in cylinder 18D is recirculated via any of the exhaust gas recirculation methods described below between stroke 2 and stroke 3.

Figures 5, 6:
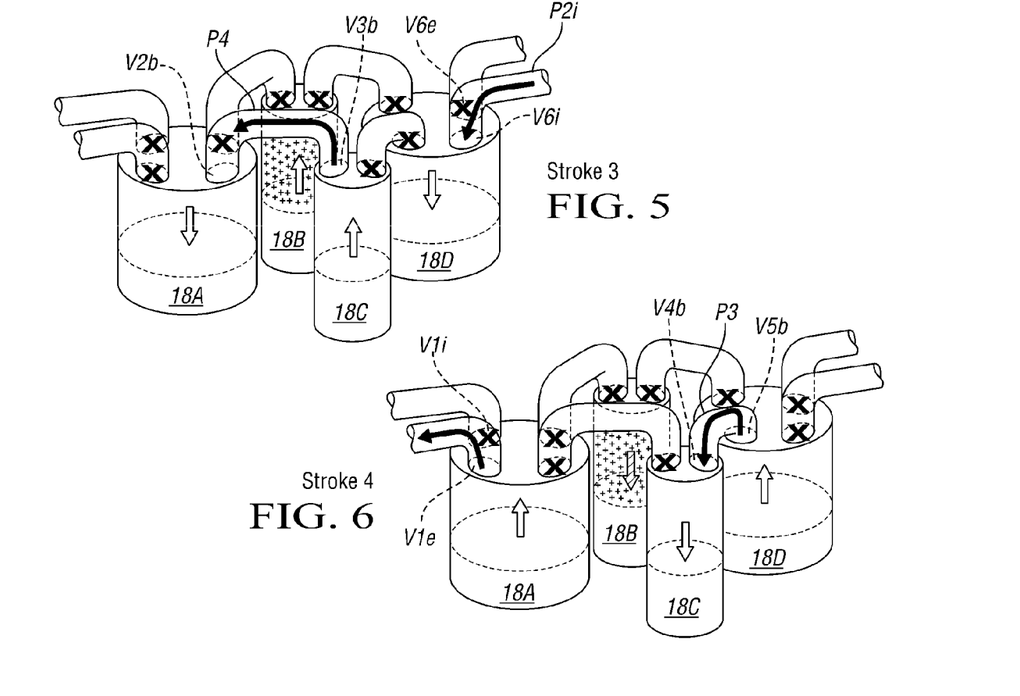
FIG. 5 is a schematic perspective illustration of the cylinders, pistons, valves, and fluid flow passages of the engine of FIG. 1, illustrating the direction of piston movement in each cylinder, fluid transfer between the cylinders, and the state of each valve during the third stroke of the chart of FIG. 2B.
FIG. 6 is a schematic perspective illustration of the cylinders, pistons, valves, and fluid flow passages of the engine of FIG. 1, illustrating the direction of piston movement in each cylinder, fluid transfer between the cylinders, and the state of each valve during the fourth stroke of the chart of FIG. 2B.

During a subsequent stroke 3, illustrated with respect to FIG. 5, valves V6i, V3b and V2b are open, and all other valves are closed (except that valve V6e may be open during a portion of the stroke, depending on the exhaust gas recirculation method implemented, as further described below). Thus, cylinder 18D is inducting fresh air in through passage P2i, while cylinder 18C undergoes second stage expansion via cylinder 18A through passage P4. Cylinder 18B is undergoing second stage compression.

During a subsequent stroke 4, illustrated with respect to FIG. 6, valves V1e, V5b and V4b are open, while all other valves are closed (except that valve V1i may be open during a portion of the stroke, depending on the exhaust gas recirculation method implemented, as further described below). Thus, cylinder 18D is compressing charge into cylinder 18C via passage P3, while cylinder 18A is exhausting and cylinder 18B is undergoing a power stroke and first stage expansion.

During a subsequent stroke 5, illustrated with respect to FIG. 7, valves V1i, V4a and V5a are open, while all other valves are closed (except that valve V1e may be open during a portion of the stroke, depending on the exhaust gas recirculation method implemented, as further described below). Thus, cylinder 18A is inducting fresh air through passage P1i, while cylinder 18B undergoes second stage expansion via cylinder 18D through passage P2. Cylinder 18C is undergoing second stage compression.

During a subsequent stroke 6, illustrated with respect to FIG. 8, valves V2a, V3a and V6e are open, while all other valves are closed (except that valve V6i may be open during a portion of the stroke depending on the exhaust gas recirculation method implemented, as further described below). Thus, cylinder 18A is compressing charge into cylinder 18B via passage P1, while cylinder 18D is exhausting. Cylinder 18C is undergoing the power stroke and first stage expansion.

During a subsequent stroke 7, illustrated with respect to FIG. 9, valves V2b, V3b and V6i are open, while all other valves are closed (except that valve V6e may be open during a portion of the stroke depending on the exhaust gas recirculation method implemented, as further described below). Thus, cylinder 18D is inducting fresh air in through passage P2i, while cylinder 18C undergoes second stage expansion via cylinder 18A through passage P4. Cylinder 18B is undergoing second stage compression. The fresh air inducted into cylinder 18D is depicted with small "+" marks, to differentiate from the recirculated exhaust shown with circular marks.

During a subsequent stroke 8, illustrated with respect to FIG. 10, valves V1e, V4b and V5b are open, while all other valves are closed (except that valve V1*i* may be open during a portion of the stroke depending on the exhaust gas recirculation method implemented, as further described below). Thus, cylinder 18D is compressing charge into cylinder 18C via passage P3, while cylinder 18A is exhausting through passage P1*e*. Cylinder 18B is undergoing a power stroke and first stage expansion.

Figures 11, 12:
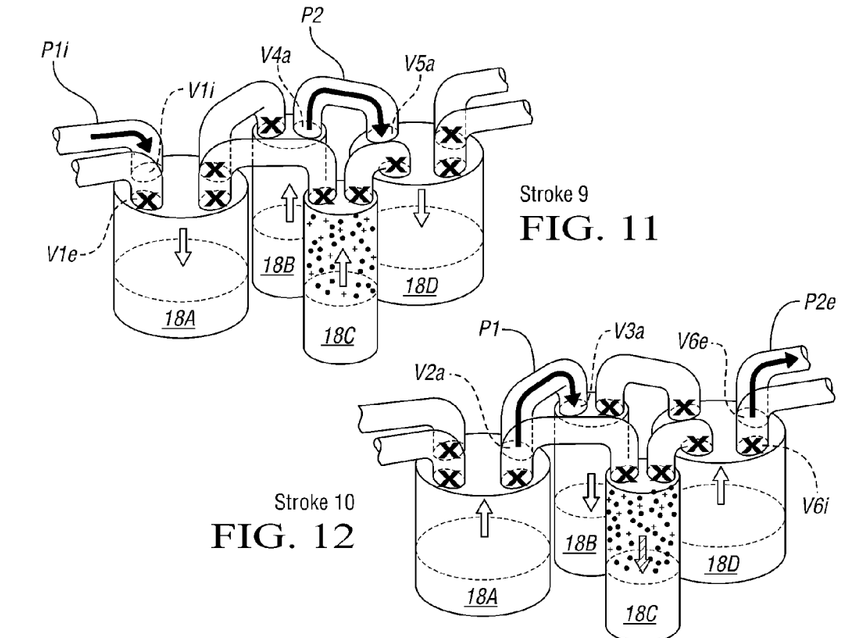
FIG. 11 is a schematic perspective illustration of the cylinders, pistons, valves, and fluid flow passages of the engine of FIG. 1, illustrating the direction of piston movement in each cylinder, fluid transfer between the cylinders, and the state of each valve during the ninth stroke of the chart of FIG. 2B.
FIG. 12 is a schematic perspective illustration of the cylinders, pistons, valves, and fluid flow passages of the engine of FIG. 1, illustrating the direction of piston movement in each cylinder, fluid transfer between the cylinders, and the state of each valve during the tenth stroke of the chart of FIG. 2B.

During a subsequent stroke 9, illustrated with respect to FIG. 11, valves V1*i*, V4*a* and V5*a* are open, while all other valves are closed (except that valve V1*e* may be open during a portion of the stroke depending on the exhaust gas recirculation method implemented, as further described below). Thus, cylinder 18A is inducting fresh air through passage P1*i*, while cylinder 18B undergoes second stage expansion via cylinder 18D through passage P2. Cylinder 18C is undergoing second stage compression.

During a subsequent stroke 10, illustrated with respect to FIG. 12, valves V2*a*, V3*a* and V6*e* are open, while all other valves are closed (except that valve V6*i* may be open during a portion of the stroke depending on the exhaust gas recirculation method implemented, as further described below). Thus, cylinder 18A is compressing charge into cylinder 18B via passage P1, while cylinder 18D is exhausting via passage P2*e*. Cylinder 18C is undergoing a power stroke and first stage expansion.

Figure 13:
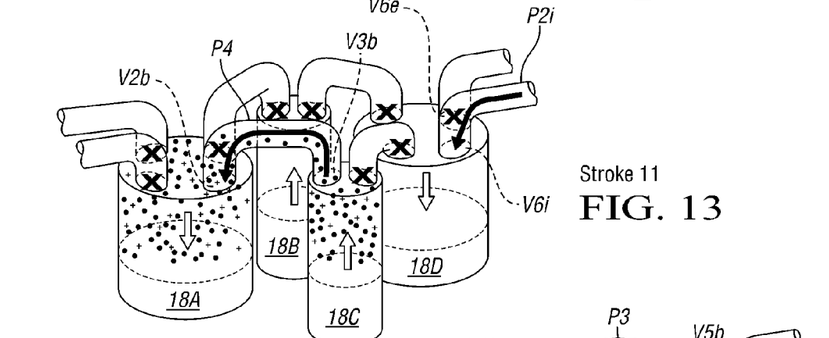
FIG. 13 is a schematic perspective illustration of the cylinders, pistons, valves, and fluid flow passages of the engine of FIG. 1, illustrating the direction of piston movement in each cylinder, fluid transfer between the cylinders, and the state of each valve during the eleventh stroke of the chart of FIG. 2B.

During a subsequent stroke 11, illustrated with respect to FIG. 13, valves V2*b*, V3*b* and V6*i* are open, while all other valves are closed (except that valve V6*e* may be open during a portion of the stroke depending on the exhaust gas recirculation method implemented, as further described below). Thus cylinder 18D is inducting fresh air via passage P2*i*, while cylinder 18C undergoes second stage expansion via cylinder 18A through passage P4. Cylinder 18B is undergoing second stage compression.

Figure 14:
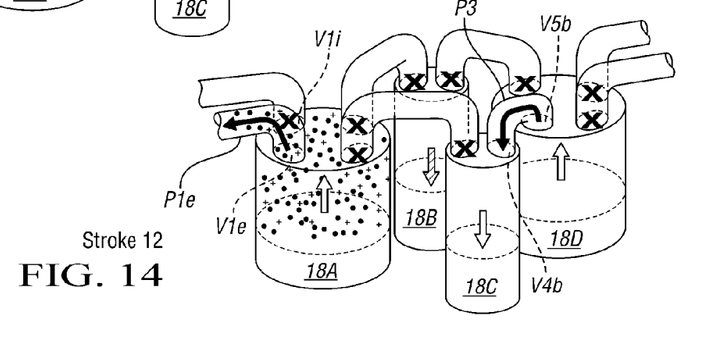
FIG. 14 is a schematic perspective illustration of the cylinders, pistons, valves, and fluid flow passages of the engine of FIG. 1, illustrating the direction of piston movement in each cylinder, fluid transfer between the cylinders, and the state of each valve during the twelfth stroke of the chart of FIG. 2B.

During a subsequent stroke 12, illustrated with respect to FIG. 14, valves V4*b*, V5*b* and V1*e* are open, while all other valves are closed (except that valve V1*i* may be open during a portion of the stroke depending on the exhaust gas recirculation method implemented, as further described below). Thus, cylinder 18D is compressing charge into cylinder 18C via passage P3, while cylinder 18A is exhausting via passage P1*e*. Cylinder 18B is undergoing the power stroke and first stage expansion. After stroke 12, a stroke in which the cylinders and valves function as described with respect to stroke 1 occurs, and the subsequent strokes 2-12 occur in a repeating cycle.

Figure 15:
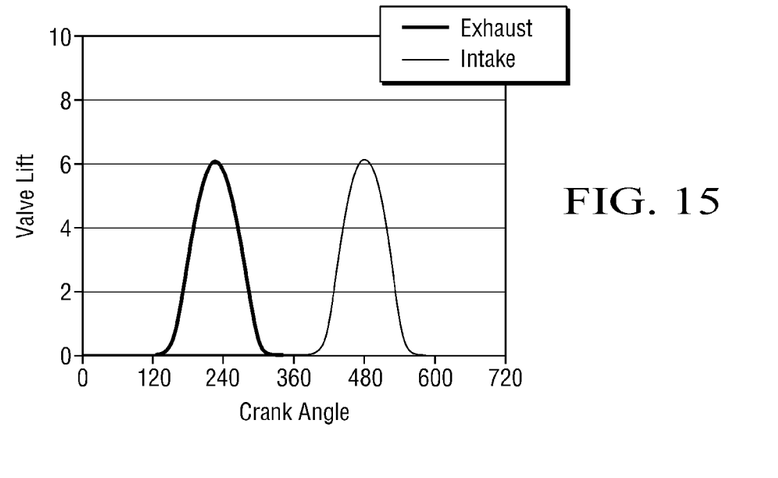
FIG. 15 is a plot of valve lift versus crankshaft angle for the exhaust and intake valves of one of the cylinders of the engine of FIG. 1 during the sixth and seventh strokes of FIGS. 8 and 9, to accomplish internal exhaust gas recirculation by recompression.
Figure 16:
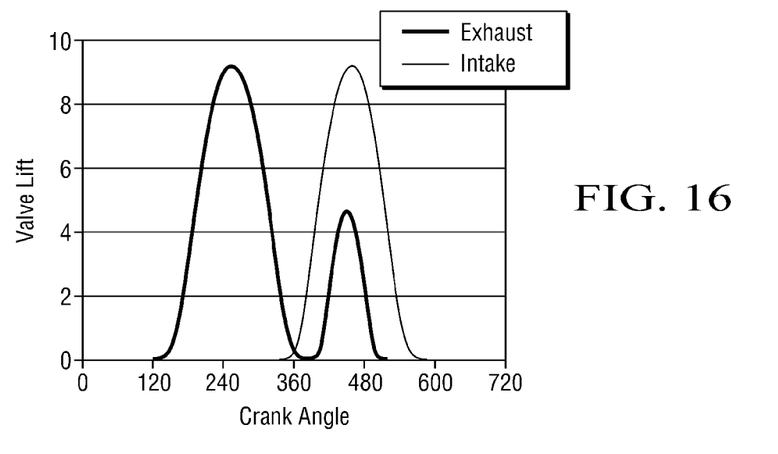
FIG. 16 is a plot of valve lift versus crankshaft angle for the exhaust and intake valves of one of the cylinders of the engine of FIG. 1 during the sixth and seventh strokes of FIGS. 8 and 9, to accomplish internal exhaust gas recirculation by exhaust gas re-breathing through the exhaust valve.
Figure 17:
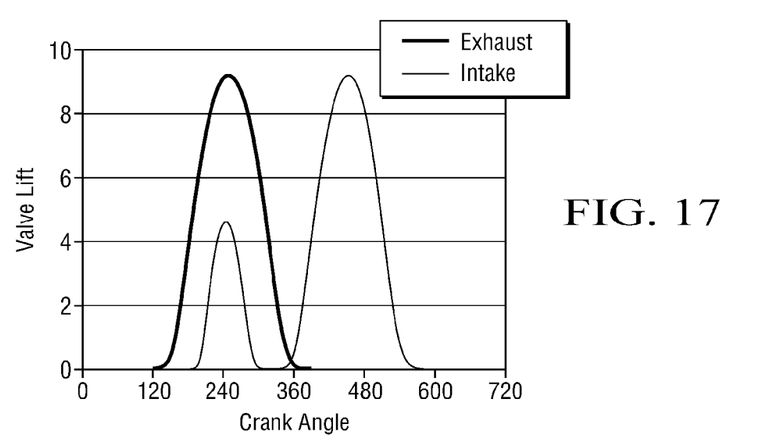
FIG. 17 is a plot of valve lift versus crankshaft angle for the exhaust and intake valves of one of the cylinders of the engine of FIG. 1 during the sixth and seventh strokes of FIGS. 8 and 9, to accomplish internal exhaust gas recirculation by exhaust gas re-breathing through the intake valve.

Referring to FIGS. 15-17, three different methods of internal exhaust gas recirculation may be implemented in the engine 10, including recompression (FIG. 15), exhaust valve re-breathing (FIG. 16), and intake valve re-breathing (FIG. 17). The methods differ in the controlled timing of intake and exhaust valves. All of the methods accomplish internal recirculation of some of the exhaust gas from the exhausting cylinder to the power cylinder connected thereto when the exhausting cylinder functions as an inductor (fresh air intake) cylinder on a subsequent stroke. Each of the methods is described below with respect to strokes 6 and 7 of FIGS. 8 and 9, although the methods are equally applicable to any pairs of strokes in which exhaust is occurring from one of the cylinders 18A, 18D, with intake occurring in the same cylinder on the following stroke.

Referring to FIG. 15, the lift of exhaust valve V6*e* during strokes 6 and 7 is indicated by the curve labeled "Exhaust", while the lift of intake valve V6*i* during strokes 6 and 7 is indicated by the curve labeled "Intake". Valve V6*e* is open during at least part of stroke 6, but closes prior to the piston in cylinder 18D reaching the top of its travel at crank angle 360 degrees. Valve V6*i* is controlled to open during stroke 7 only after valve V6*e* is completely closed, after the piston in cylinder 18D has begun to descend. Thus, some of the exhaust gas (i.e., fluid that has already been subjected to combustion in cylinder 18B during stroke 4) remains in cylinder 18D, and is not exhausted through either of the valves V6*e*, V6*i*. The exhaust gas remaining mixes with the intake air admitted through valve V6*i* during stroke 7, and is recompressed through cylinders 18D and 18C in strokes 8 and 9, and then subjected to combustion in cylinder 18C in stroke 10.

Referring to FIG. 16, exhaust gas recirculation by an exhaust valve re-breathing method is illustrated. Valve V6*e* is reopened during the lift of intake valve V6*i* during stroke 7. Thus, some of the exhaust gas vented to passage P2*e* is drawn back into the cylinder 18D during the induction stroke 7 and mixed with the fresh air entering through intake valve V6*i*. The fluid mixture processed through the cylinders 18D, 18C and 18A during subsequent strokes 8-12 thus includes exhaust gas re-breathed through exhaust valve V6*e*.

Referring to FIG. 17, exhaust gas recirculation by an intake valve re-breathing method is illustrated. Valve V6*i* is open during a portion of the lift of exhaust valve V6*e* during stroke 6. Thus, some of the exhaust gas is vented into passage P2*i* during stroke 6, and is then sucked back into the cylinder along with fresh air through valve V6*i* during subsequent stroke 7, when the intake valve V6*i* is lifted while the exhaust valve V6*e* is closed. The fluid mixture processed through the cylinders 18D, 18C and 18A during subsequent strokes 8-12 thus includes the exhaust gas re-breathed through intake valve V6*i*.

Figure 18:
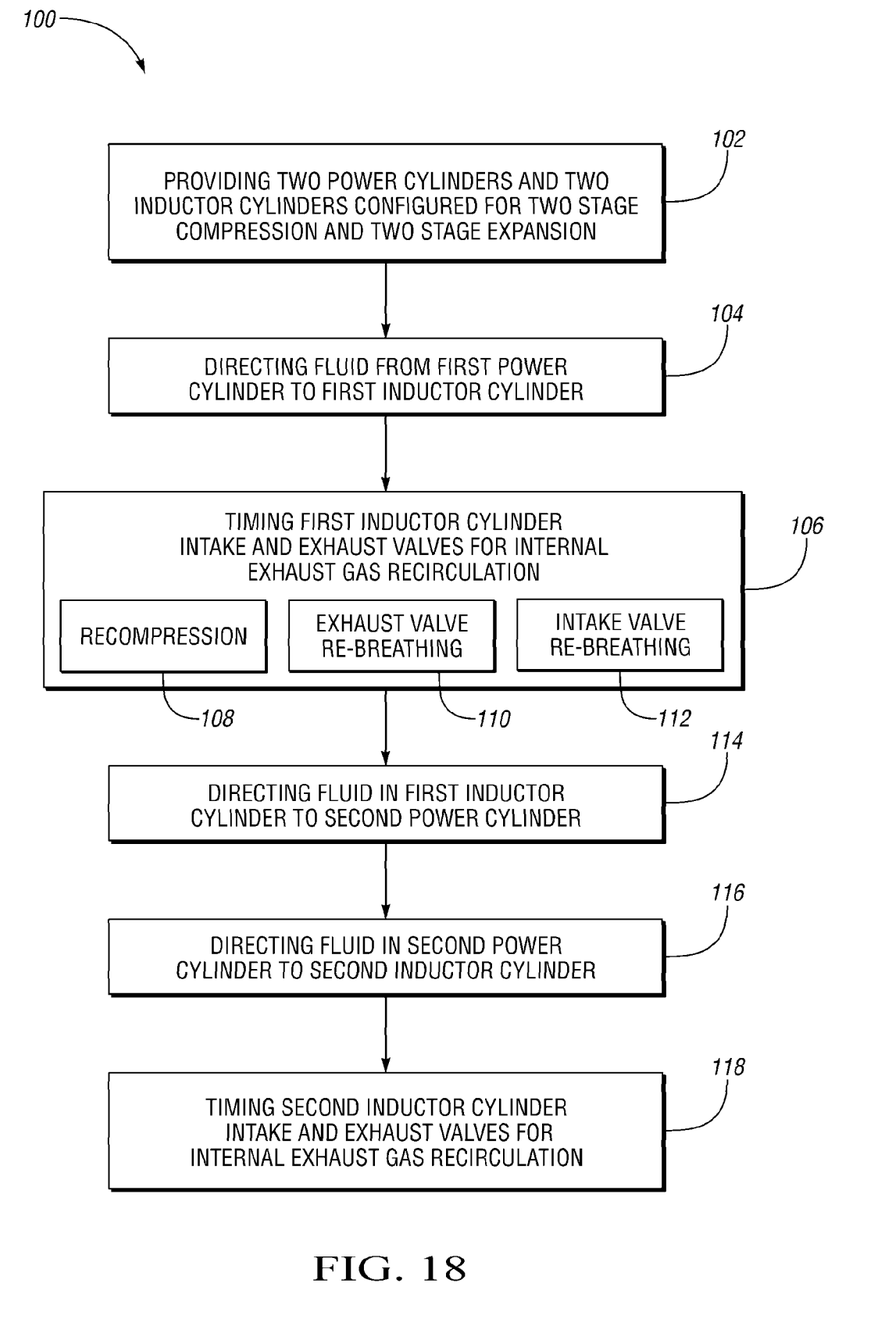
FIG. 18 is a flowchart illustrating a method of internal exhaust gas recirculation for the engine of FIG. 1.

Accordingly, a method 100 shown in FIG. 18 of internal exhaust gas recirculation for the engine of FIG. 1 includes block 102, providing two power cylinders 18B, 18C and two inductor cylinders 18A, 18D configured for two stage compression and two stage expansion, as described with respect to engine 10 in FIGS. 1-14. The method 100 includes block 104, directing fluid from a first power cylinder 18B to a first inductor cylinder 18D, as described with respect to stroke 5 of FIG. 7. Next, the method 100 includes block 106, timing the intake valve V6*i* and the exhaust valve V6*e* of first power cylinder 18D to accomplish internal exhaust gas recirculation. Block 106 may be accomplished by recompression, block 108, as described with respect to FIG. 15. Alternatively, block 106 may be accomplished by exhaust valve re-breathing, block 110, as described with respect to FIG. 16. Still alternatively, block 106 may be accomplished by intake valve re-breathing, block 112, as described with respect to FIG. 17.

Figures 7, 8, 9, 10:
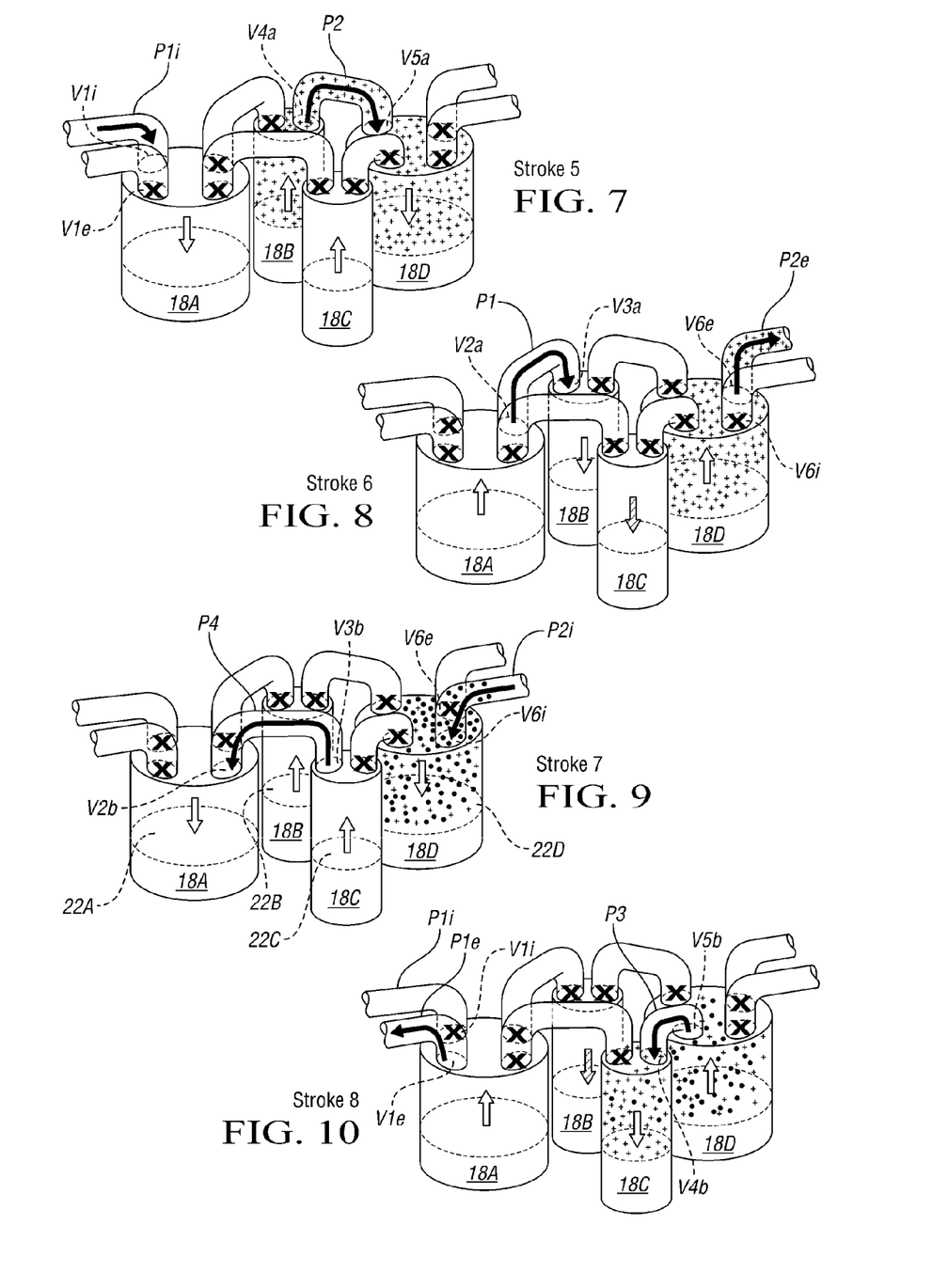
FIG. 7 is a schematic perspective illustration of the cylinders, pistons, valves, and fluid flow passages of the engine of FIG. 1, illustrating the direction of piston movement in each cylinder, fluid transfer between the cylinders, and the state of each valve during the fifth stroke of the chart of FIG. 2B.
FIG. 8 is a schematic perspective illustration of the cylinders, pistons, valves, and fluid flow passages of the engine of FIG. 1, illustrating the direction of piston movement in each cylinder, fluid transfer between the cylinders, and the state of each valve during the sixth stroke of the chart of FIG. 2B.
FIG. 9 is a schematic perspective illustration of the cylinders, pistons, valves, and fluid flow passages of the engine of FIG. 1, illustrating the direction of piston movement in each cylinder, fluid transfer between the cylinders, and the state of each valve during the seventh stroke of the chart of FIG. 2B.
FIG. 10 is a schematic perspective illustration of the cylinders, pistons, valves, and fluid flow passages of the engine of FIG. 1, illustrating the direction of piston movement in each cylinder, fluid transfer between the cylinders, and the state of each valve during the eighth stroke of the chart of FIG. 2B.

In block 114, fluid, including a mixture of the recirculated exhaust gas and fresh intake air, is directed from the first inductor cylinder 18D to the second power cylinder 18C, as described with respect to stroke 8 of FIG. 10. In block 116, fluid is directed from the second power cylinder 18C to the second inductor cylinder 18A, as described with respect to stroke 11 of FIG. 13. Finally, the method includes block 118, timing the exhaust valve V1*e* and the intake valve V1*i* of the second inductor cylinder 18A to accomplish internal exhaust gas recirculation, which may be by any of the methods of blocks 108, 110 and 112.

While the best modes for carrying out the invention have been described in detail, those familiar with the art to which this invention relates will recognize various alternative designs and embodiments for practicing the invention within the scope of the appended claims.

The invention claimed is:
1. An internal combustion engine comprising:
four cylinders each having a respective piston positioned therein and connected with a crankshaft for movement in the respective cylinder according to a four-stroke cycle having an intake stroke, a compression stroke, an expansion stroke, and an exhaust stroke;

each cylinder having a plurality of ports with a plurality of valves openable and closable to control fluid flow into and out of the cylinder through the ports; wherein combustion occurs in a first two (18B, 18C) of the four cylinders (18A, 18B, 18C, 18D) that are each operatively interconnected in fluid flow communication between a second two (18A, 18D) of the four cylinders via respective passages (P1, P2, P3, P4) connecting respective ones of the ports of the respective cylinders, each such passage connecting only two of the four cylinders;

a controller (19) operatively connected to the plurality of valves (V1$i$, V1$e$, V2$a$, V2$b$, V3$a$, V3$b$, V4$a$, V4$b$, V5$a$, V5$b$, V6$e$, V6$i$) and configured to open and close different ones of the valves such that fluid directed from the first two (18B, 18C) of the four cylinders to the second two (18A, 18D) of the four cylinders via the respective passages (P2, P4) after combustion in the first two (18B, 18C) of the four cylinders is redirected via the passages (P1, P3) from the second two (18A, 18D) of the four cylinders to the first two (18B, 18C) of the four cylinders after the respective exhaust strokes of the second two (18A, 18D) of the four cylinders.

2. The engine of claim 1, wherein the plurality of valves includes respective intake valves and exhaust valves on the second two of the four cylinders; wherein the controller closes the exhaust valves prior to an end of the respective exhaust strokes of the pistons in the respective second two of the four cylinders and the controller opens the intake valves after the beginning of the respective intake strokes of the pistons in the respective second two of the four cylinders so that said at least some of the fluid is retained in the second two of the four cylinders and is subsequently recirculated from the second two of the four cylinders to the first two of the four cylinders.

3. The engine of claim 1, wherein the plurality of valves includes respective intake valves and exhaust valves on the second two of the four cylinders; wherein the controller opens the exhaust valves during at least some of respective periods in which the respective intake valves are opened during the respective intake strokes of the pistons of the respective second two of the four cylinders so that said at least some of the fluid exhausted from the second two of the four cylinders through the respective exhaust valves during the respective exhaust strokes of the pistons of the respective second two of the four cylinders reenters the respective second two of the four cylinders during the respective intake strokes and is subsequently recirculated from the second two of the four cylinders to the first two of the four cylinders.

4. The engine of claim 1, wherein the plurality of valves includes respective intake valves and exhaust valves on the second two of the four cylinders; wherein the controller opens the intake valves during at least some of respective periods in which the respective exhaust valves are opened during the respective exhaust strokes of the pistons of the respective second two of the four cylinders so that said at least some of the fluid is exhausted into the respective intake valves during the respective exhaust strokes and reenters the respective second two of the four cylinders during the respective subsequent intake strokes and is subsequently recirculated from the second two of the four cylinders to the second two of the four cylinders, respectively.

5. The engine of claim 1, wherein a ratio of displacement of either of the second two of the four cylinders to either of the first two of the four cylinders is less than or equal to about 5:1 to greater than or equal to about 1.1:1.

6. The engine of claim 1, wherein the controller is configured to time opening and closing of the plurality of valves and combustion such that expansion of fluid occurs in one of the first two of the four cylinders during one half rotation of the crankshaft and continues in one of the second two of the four cylinders during an immediately subsequent half rotation of the crankshaft.

7. The engine of claim 1, wherein the controller is configured to time opening and closing of the plurality of valves and combustion such that compression of fluid occurs in one of the second two of the four cylinders during one half rotation of the crankshaft and continues in one of the first two of the four cylinders during an immediately subsequent half rotation of the crankshaft.

8. An internal combustion engine comprising:
a crankshaft;
a first, a second, a third, and a fourth cylinder;
a first, a second, a third, and a fourth piston positioned in the first, second, third and fourth cylinders, respectively, and operatively connected with the crankshaft for movement in the respective cylinders;
wherein the first and fourth cylinders each have four ports and the second and third cylinders each have two ports;
a respective valve supported in each of the port; a controller operatively connected to each respective valve and configured to selectively open and close the respective valves to enable a respective four-stroke cycle in each of the cylinders coinciding with two rotations of the crankshaft, the valves including:
a respective intake valve, exhaust valve, first transfer valve, and second transfer valve each positioned at a respective one of the four ports of the first and fourth cylinders, and selectively openable and closeable by the controller to permit fluid transfer into and out of the first and fourth cylinders, respectively;
a respective first and second valve each positioned at a respective one of the two ports of the second and third cylinders, and selectively openable and closable by the controller to permit fluid transfer into and out of the second and third cylinders, respectively;
structure defining a first, a second, a third, and a fourth passage; wherein the first cylinder is in selective fluid communication with the second cylinder via the first passage, the first transfer valve of the first cylinder, and first valve of the second cylinder;
wherein the second cylinder is in selective fluid communication with the fourth cylinder via the second passage, the second valve of the second cylinder, and the first transfer valve of the fourth cylinder; wherein the fourth cylinder is in selective fluid communication with the third cylinder via the third passage, the second transfer valve of the fourth cylinder, and the first valve of the third cylinder; wherein the third cylinder is in selective fluid communication with the first cylinder via the fourth passage, the second valve of the third cylinder, and the second transfer valve of the first cylinder; the fluid communication between the cylinders via the passages and the opening and closing of the respective valves by the controller thereby allowing expansion and compression each to occur in two stages during two respective strokes in a respective two of the four cylinders; wherein the engine is configured so that combustion occurs in at least the second and third cylinders; and wherein opening and closing of the intake and exhaust valves of the first and fourth cylinders by the controller is such that at least some fluid transferred to the first and fourth cylinders after combustion in the third and second cylinders, respectively, is recirculated from the first and fourth cylinders to the second and third cylinders, respectively, during respective subsequent strokes of the respective pistons.

9. The engine of claim 8, wherein the controller is configured to close the exhaust valves of the respective first and fourth cylinders prior to an end of a respective exhaust stroke of the respective pistons in the cylinders in the first and fourth cylinders; and wherein the controller is configured to open the intake valves of the respective pistons in the first and fourth cylinders after the beginning of a respective intake stroke of the first and fourth cylinders so that said at least some of the fluid is retained in the first and fourth cylinders and is subsequently recirculated from the first and fourth cylinders to the second and third cylinders, respectively.

10. The engine of claim 8, wherein the controller is configured to open the exhaust valves of the respective first and fourth cylinders during at least some of respective periods in which the respective intake valves of the first and fourth cylinders are opened during respective intake strokes of the pistons in the first and fourth cylinders so that said at least some of the fluid is exhausted from the first and fourth cylinders through the respective exhaust valves during respective exhaust strokes of the pistons in the first and fourth cylinders and reenters the respective first and fourth cylinders during the respective intake strokes of the pistons in the first and fourth cylinders for subsequent recirculation from the first and fourth cylinders to the second and third cylinders, respectively.

11. The engine of claim 8, wherein the controller is configured to open the intake valves of the respective first and fourth cylinders during at least some of the respective periods in which the respective exhaust valves of the first and fourth cylinders are opened during respective exhaust strokes of the pistons in the first and fourth cylinders so that said at least some of the fluid is exhausted into the respective intake valves during the respective exhaust strokes and then reenters the respective first and fourth cylinders during respective subsequent intake strokes of the pistons in the first and fourth cylinders for subsequent recirculation from the first and fourth cylinders to the second and third cylinders, respectively.

12. The engine of claim 8, wherein a ratio of displacement of either of the second and third cylinders to either of the first and fourth cylinders is not greater than about 5:1 and not less than about 1.1:1.

13. The engine of claim 8, wherein the controller is configured to time the opening and closing of the respective valves and combustion such that expansion of fluid occurs in one of the second and third cylinders during one half rotation of the crankshaft and continues in one of the first and fourth cylinders during an immediately subsequent half rotation of the crankshaft.

14. The engine of claim 8, wherein the controller is configured to time the opening and closing of the respective valves and combustion such that compression of fluid occurs in one of the first and fourth cylinders during one half rotation of the crankshaft and continues in one of the second and third cylinders during an immediately subsequent half rotation of the crankshaft.

* * * * *